United States Patent Office 2,922,670
Patented Jan. 26, 1960

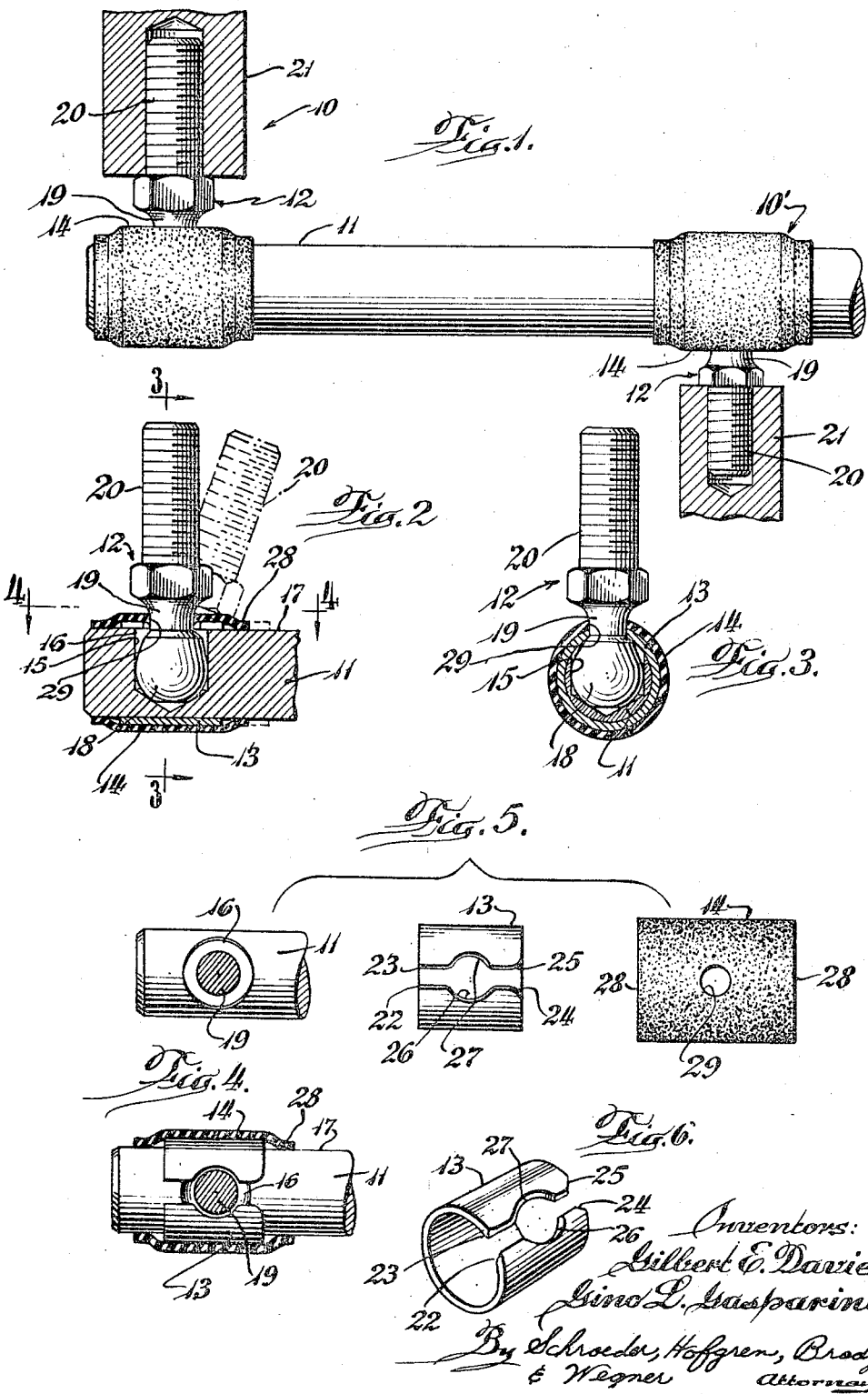

2,922,670
BALL JOINT

Gilbert E. Davies and Gino L. Gasparini, Fort Wayne, Ind., assignors to Superior Ball Joint Corporation, a corporation of Indiana Application March 27, 1958, Serial No. 724,285

1 Claim. (Cl. 287—90)

This invention relates to joints and particularly to ball joints.

An object of the invention is to provide a ball joint having new and improved means for sealing the ball cavity.

Another object is to provide a ball joint having improved strength characteristics.

A further object is to provide a new and improved ball joint which may be readily assembled.

Still another object is to provide a new and improved ball joint including a cylindrical body member in which the ball cavity is provided, a stud having a ball portion received in the cavity and a stem portion extending from the cavity, and a sleeve slidably mounted on the body member and having a pair of spaced edges overlying the recess to preclude movement of the ball portion outwardly therefrom while permitting ready movement of the stem angularly relative to the axis of the recess.

Still another object is to provide such a ball joint having a resiliently stretchable annular seal embracing the sleeve for movement therewith and having an opening through which the stem sealingly extends.

Other features and advantages of the foregoing application will be apparent in the following description of a preferred embodiment as illustrated in the accompanying drawings, in which:

Figure 1 is a fragmentary side elevation of a control assembly including two ball joints embodying the invention;

Figure 2 is a longitudinal section of one ball joint embodying the invention, portions thereof being shown in dotted lines in the position assumed when the stud is disposed angularly to the recess axis.

Figure 3 is a section taken approximately along line 3—3 of Figure 2;

Figure 4 is a section taken approximately along line 4—4 of Figure 2;

Figure 5 is an exploded view thereof; and

Figure 6 is a perspective view of the retaining sleeve.

In the exemplary embodiment of the invention, as disclosed in the drawings, a ball joint generally designated 10 is shown to comprise a cylindrical body member or rod 11, a stud member 12, a retaining sleeve 13, and a sealing member 14. In Figure 1, a ball joint 10 is shown to be installed adjacent one end of the rod 11 and a second ball joint designated 10′, similar to ball joint 10, is shown to be installed at a distance from the end of the rod, illustrating the use of a ball joint in a multiple ball joint rod control assembly.

More specifically, rod 11 comprises a rigid cylindrical member preferably formed of a high strength rigid material, such as steel. At a desired distance from the end thereof, the rod is provided with a recess 15. Recess 15 is preferably cylindrical and extends radially, or transversely, of the rod to have its outer end 16 open through the cylindrical surface 17 of the rod.

Stud member 12 and recess 15 are preferably of a construction similar to that disclosed in our copending application, Serial No. 540,881, filed October 17, 1955, now Patent No. 2,859,060, to which application reference may be had for a detailed description thereof. As seen in Figs. 1 through 3 hereof, stud member 12 comprises an end, ball portion 18 movably received in and extending substantially across recess 15. Extending from ball portion 18 outwardly through end 16 of recess 15 is a stem portion 19 having a transverse extent, or diameter, less than that of the diameter of outer end 16 whereby, as seen in Figure 2, stud member 12 may have substantial angular axial displacement relative to the axis of recess 15. Extending outwardly from stem portion 19 is a connecting portion 20 which may be threaded for securing engagement with an element intended to be connected to the rod, as fragmentarily shown at 21 in Figure 1.

Retaining sleeve 13 serves to retain ball portion 18 of the stud member in recess 15. As best seen in Figure 6, retaining sleeve 13 comprises a tubular element longitudinally split at one portion to define a pair of spaced edges 22 and 23. The edges 22 and 23 are flared at one end 24 and 25 respectively to provide an entrance guide means and are recessed at midportions 26 and 27 respectively to define an opening having a diameter slightly larger than the diameter of stem portion 19 of the stud member. Sleeve 13 is preferably formed of a hardened spring steel substantially preventing radially outward movement of edges 22 and 23 while allowing some widening of the space therebetween circumferentially of the sleeve. The internal diameter of sleeve 13 is preferably equal to the outer diameter of rod 11 so that the sleeve may have slidable movement over the rod. The spacing between edges 22 and 23, except at ends 24 and 25 and recess portions 26 and 27, is slightly smaller than the diameter of stem portion 19 of stud member 12, however, the springiness of the retaining sleeve permits the spacing to be increased to pass the stem therebetween as will be brought out more fully subsequently.

Sealing member 14 comprises a resilient annular member, or sleeve, preferably formed of a material such as rubber or a plastic. The unstretched inner diameter of sealing member 14 is preferably equal to the outside diameter of rod 11, so that when the sealing member is mounted over retaining sleeve 13, the sealing member snugly embraces the sleeve. Intermediate its ends 28, the sealing member is provided with a circular opening 29 having a diameter slightly smaller than the diameter of stem portion 19 and which, when the sealing member is mounted on retaining sleeve 13, is disposed coaxially of recess portions 26 and 27. As best seen in Figure 4, the length of sealing member 14 is preferably slightly greater than the length of retaining sleeve 13, so that when retaining sleeve and sealing member are installed on rod 11, ends 28 extend around the ends of the retaining sleeve into slidable abutment with rod surface 17 to preclude entry of foreign material between the sleeve and the rod surface.

To assemble ball joint 10, sealing member 14 is arranged on rod 11 with opening 29 thereof in coaxial alignment with recess 15. Ball portion 18 of stud member 12 is then inserted through opening 29 until ball 18 is fully received within recess 15, the resilient nature of sealing member 14 readily accommodating the expansion of opening 29 to permit the passage of ball portion 18 therethrough and causing the opening 29 to be reduced when the ball portion has passed therethrough, whereby the edges thereof sealingly engage the stem portion 19 of the stud.

Retaining sleeve 13 is now installed to retain the ball portion 18 of the stud member within recess 15. The sleeve is moved over rod 11 with flared edge portions 24 and 25 foremost. End 28 of sealing member 14 is pried outwardly to permit the retaining sleeve to be moved thereunder until edge ends 24 and 25 engage the stud stem portion. An increased force is now applied to the retaining sleeve urging the flared ends 24 and 25 against the stem portion 19 whereupon the ends 24 and 25 cam the sleeve edges 22 and 23 more widely apart until stem portion 19 is disposed therebetween. Longitudinal movement of the sleeve is continued until the mid-portion of the sleeve is juxtaposed to stem 19 whereupon the stem is freely received between recessed portions 26 and 27 of the sleeve. This allows the sleeve to return to its unexpanded state, and as the spacing between the edges 22 and 23 adjacent edges 26 and 27 is less than the diameter of stem portion 19, the sleeve is substantially locked against separation from the stud member. The opening through the sleeve defined by recessed portions 26 and 27 being slightly greater than the diameter of stem portion 19 permits some play therebetween; however, the opening is sufficiently smaller than the diameter of ball portion 18 of the stud member so that the edges of the sleeve overlie the ball portion in recess 16 thereby precluding the movement of the ball portion outwardly from the recess.

Sealing member 14 has sealing engagement with stem portion 19 at opening 29 and with rod surface 17 longitudinally outwardly from the retaining sleeve at ends 28. Thus, the sealing member effectively protects the relatively movable portions of the ball joint against introduction of undesirable foreign materials, such as abrasives, and retains lubricant within the confines of the recess 15. As the sealing member is effectively mounted on the retaining sleeve, the sealing member moves with the retaining sleeve whenever the angular displacement of the stud member is sufficient to reposition the retaining sleeve relative to outer end 16 of the recess. Flexing of the sealing member at the edges of opening 28 is substantially eliminated as the sealing member moves with the stem portion 19 rather than merely accommodates its motion by a flexing action. Such improved sealing action of member 14 with stem portion 19 greatly improves the useful life of the sealing member and provides for a more positive seal of the recess 15.

It should be noted that it is necessary to provide only a single, simple cylindrical recess in rod 11 for each ball joint means. Installation of the ball joint at a distance from the end of the rod, as ball joint 10', thus, does not require special machining or forming of the rod throughout its length between the end thereof and the ball joint as is necessary in known ball joint constructions. Resultingly, the instant ball joint, in addition to providing improved ease of installation and freedom from abrasive wear, provides improved strength and simplicity of manufacture.

Ball joint 10 may be installed without the sealing member 14 where the problem of excluding undesirable foreign materials is not present. The installation of ball joint 10 without the sealing member is similar to the installation described above, the step of providing and installing the sealing member being eliminated. It should be noted that even without the sealing member the extension of the retaining sleeve edges in overlying relationship to recess 15 affords a substantial protection against entrance of foreign material into the recess.

If for any reason it is desired to remove stud member 12 from rod 11, sleeve 13 is circumferentially expanded and moved longitudinally over the rod until the sleeve is disposed laterally of the stud member. The ball portion of the stud member is thus freed for removal from recess 15 allowing the stud member to be removed from the rod as desired.

While we have shown and described certain embodiments of our invention, it is to be understood that it is capable of many modifications. Changes, therefore, in the construction and arrangement may be made without departing from the spirit and scope of the invention as disclosed in the appended claim.

We claim:

A ball joint comprising: a rod provided with a recess intermediate the ends thereof, said recess having an outer end opening through the side of the rod; a stud having an end ball portion movable in and extending substantially across said recess and a stem portion extending from the ball portion outwardly from said recess and having a transverse extent less than that of said recess outer end to permit the stud to have substantial angular axial displacement relative to the central outwardly extending axis of said recess; a first sleeve slidably mounted on said rod, said sleeve being longitudinally split at one portion to define a pair of spaced edges overlying said recess outer end and positioned closely adjacent the stem whereby movement of the stem moves the sleeve and movement of the sleeve on the rod permits movement of said stem portion fully across said recess outer end; and a second sleeve formed of a resiliently stretchable material substantially fixedly embracing the first sleeve for movement therewith and having an opening through which said stem portion of the stud extends, the edges of said opening slidingly engaging said stem and said second sleeve having portions extending longitudinally beyond the ends of the first sleeve and slidably, sealingly engaging the rod to preclude entry of foreign material between the first sleeve and the rod.

References Cited in the file of this patent

UNITED STATES PATENTS

| 946,183 | Williams | Jan. 11, 1910 |
| 1,531,557 | Klages | Mar. 31, 1925 |

FOREIGN PATENTS

| 8,192 | Great Britain | Apr. 1, 1914 |
| 556,965 | France | Oct. 1, 1923 |
| 223,794 | Great Britain | Oct. 30, 1924 |
| 738,300 | France | Dec. 23, 1932 |
| 620,266 | Great Britain | Mar. 22, 1949 |